United States Patent
Gharib et al.

(10) Patent No.: US 10,961,790 B2
(45) Date of Patent: Mar. 30, 2021

(54) METHOD AND APPARATUS FOR RETAINING COMPONENTS IN A DOWNHOLE MOTOR

(71) Applicant: Halliburton Energy Services, Inc., Houston, TX (US)

(72) Inventors: Hossam Gharib, Edmonton (CA); John Keith Savage, Edmonton (CA)

(73) Assignee: Halliburton Energy Services, Inc., Houston, TX (US)

( * ) Notice: Subject to any disclaimer, the term of this patent is extended or adjusted under 35 U.S.C. 154(b) by 289 days.

(21) Appl. No.: 15/767,968

(22) PCT Filed: Nov. 19, 2015

(86) PCT No.: PCT/US2015/061598
§ 371 (c)(1),
(2) Date: Apr. 12, 2018

(87) PCT Pub. No.: WO2017/086979
PCT Pub. Date: May 26, 2017

(65) Prior Publication Data
US 2018/0305988 A1    Oct. 25, 2018

(51) Int. Cl.
*E21B 41/00* (2006.01)
*F16L 19/065* (2006.01)
*E21B 4/02* (2006.01)
*E21B 17/16* (2006.01)

(52) U.S. Cl.
CPC .............. *E21B 17/16* (2013.01); *E21B 4/02* (2013.01); *E21B 41/0021* (2013.01); *F16L 19/065* (2013.01); *Y10T 403/7056* (2015.01)

(58) Field of Classification Search
CPC ...... E21B 41/0021; E21B 4/02; F16L 19/065; Y10T 403/7056
See application file for complete search history.

(56) References Cited

U.S. PATENT DOCUMENTS

| | | | | |
|---|---|---|---|---|
| 172,689 | A | * | 1/1876 | Barrett ................ B23B 31/1253 279/59 |
| 579,265 | A | * | 3/1897 | Gulick .................... B23B 31/20 279/49 |
| 611,159 | A | * | 9/1898 | Webb ..................... B23B 31/20 279/49 |

(Continued)

FOREIGN PATENT DOCUMENTS

WO        2014126889 A2      8/2014

OTHER PUBLICATIONS

International Search Report and the Written Opinion for International Application No. PCT/US2015/061598 dated Aug. 19, 2016, 17 pages.

*Primary Examiner* — Blake E Michener
(74) *Attorney, Agent, or Firm* — Chamberlain Hrdlicka (57) ABSTRACT

Methods and apparatus are disclosed for retaining components in a downhole motor in the event of a mechanical separation or failure of one or more components therein. As described, the retention mechanism does not require a threaded connection to components of the mud motor drivetrain. Downhole motor assemblies including the new catch mechanism also include a structural element to engage the catch assembly and the components to which it is attached in the event of a mechanical failure within the mud motor assembly.

14 Claims, 6 Drawing Sheets

(56) References Cited

U.S. PATENT DOCUMENTS

| | | | | |
|---|---|---|---|---|
| 738,445 A * | 9/1903 | Hoffmann | F16C 35/073 | 384/540 |
| 758,549 A * | 4/1904 | Melius | F16D 1/096 | 403/344 |
| 1,201,706 A * | 10/1916 | Dodge | F16B 2/065 | 403/344 |
| 1,219,978 A * | 3/1917 | Masters | F16C 25/02 | 384/264 |
| 1,959,079 A * | 5/1934 | Holt | F16L 19/0656 | 285/323 |
| 1,978,047 A * | 10/1934 | Haury | F16L 19/065 | 277/622 |
| 1,989,674 A * | 2/1935 | Boas | F16L 19/065 | 285/342 |
| 2,247,031 A * | 6/1941 | Norton | F16L 19/065 | 277/622 |
| 2,466,472 A * | 4/1949 | Oster | B23B 23/02 | 403/370 |
| 2,477,969 A * | 8/1949 | Donner | F16L 19/065 | 277/607 |
| 2,496,402 A * | 2/1950 | Mcveigh | D02H 13/28 | 242/118.5 |
| 3,593,390 A * | 7/1971 | Pettigrew | G21C 1/20 | 24/526 |
| 4,260,182 A * | 4/1981 | Bruner | F16L 19/10 | 285/23 |
| 4,268,185 A * | 5/1981 | Mullenberg | F16D 1/093 | 403/16 |
| 5,009,539 A * | 4/1991 | Muellenberg | F16D 1/094 | 403/370 |
| 7,445,061 B1 | 11/2008 | Falgout, Sr. et al. | | |
| 8,025,110 B2 | 9/2011 | Falgout, Jr. et al. | | |
| 2005/0126828 A1 | 6/2005 | Pinol et al. | | |
| 2010/0148501 A1* | 6/2010 | Bennett | F16L 19/061 | 285/382.7 |
| 2010/0171309 A1* | 7/2010 | Kainec | F16L 19/065 | 285/382 |
| 2010/0314172 A1* | 12/2010 | Underwood | E21B 4/02 | 175/57 |
| 2014/0060936 A1 | 3/2014 | Connell et al. | | |
| 2014/0079574 A1 | 3/2014 | Brunner et al. | | |
| 2014/0161515 A1* | 6/2014 | Heston | F16D 1/094 | 403/342 |
| 2014/0332275 A1 | 11/2014 | Murray et al. | | |
| 2015/0068810 A1 | 3/2015 | Altimas | | |
| 2016/0281429 A1* | 9/2016 | Wilson | E21B 4/02 | |
| 2017/0058606 A1* | 3/2017 | Gharib | F16C 17/10 | |
| 2018/0023628 A1* | 1/2018 | Johnson | F16D 1/094 | 403/370 |
| 2018/0044997 A1* | 2/2018 | Gharib | F16C 41/00 | |
| 2018/0291693 A1* | 10/2018 | Savage | E21B 4/02 | |

* cited by examiner

METHOD AND APPARATUS FOR RETAINING COMPONENTS IN A DOWNHOLE MOTOR

BACKGROUND

The present disclosure relates generally to methods and apparatus for retaining components in a downhole motor in the event of a mechanical separation or failure of one or more components therein; and more specifically relates to a catch mechanism which may be secured to a desired component in the downhole motor (such as, for example, the rotor of the motor, or a component of a driveshaft assembly, as will typically be coupled to a downhole end of the rotor). As discussed in more detail later herein, the described catch mechanism engages the downhole motor component without requiring a threaded engagement to the component, which is particularly advantageous. The catch mechanism described herein is configured to securely engage a surface of the motor component to secure the catch mechanism in a fixed longitudinal position relative to the component.

The use of downhole motors in drilling operations is well known. The most common such downhole motors are positive displacement-type motors, which include a power section having a lobed stator and a differently lobed rotor therein, where pumping of drilling mud through the power section causes rotation of the rotor. The power section is coupled to a transmission assembly, in which a drivetrain assembly is coupled to the rotor and extends through a bearing pack that facilitates changing the eccentric rotation of the rotor to single axis rotation proximate the lower end of the drivetrain assembly.

One concern that can exist with downhole motors is the risk that in the event of a mechanical separation or failure during use in a well, some portion of the rotor, or of the drivetrain assembly coupled thereto, may separate from the remainder of the motor assembly and be lost in the well. In that situation, the drill string will have to be removed from the well, and fishing and/or milling operations performed to remove the separated components from the wellbore. Such remedial efforts are obviously time-consuming and expensive.

In many circumstances, such as where wells are drilled offshore, sometimes to great depths, the drilling can be difficult, with exceptional loads and stress placed upon all components in the drillstring, particularly on the driven components of the downhole motor and the other components coupled thereto. As a result, catch mechanisms have been proposed for use with downhole motor components, which threadably couple to the motor component to create an expanded dimension of the catch mechanism sufficient to engage an integral portion of the motor assembly, such as a shoulder extending inwardly from the housing, or another component supported by the housing. Such mechanisms, while generally satisfactory for the catch function, present other difficulties.

After use of a downhole motor, the motor will be torn down and inspected, and in most cases refurbished for another use. Threaded components in the motor drivetrain necessitate a more rigorous examination during such inspections, such as a black light inspection (often by a third party), before refurbishment can occur. Additionally, a threaded component of a downhole motor drivetrain provides a potential disadvantage because of the stresses that can occur in a threaded coupling, as it can represent another potential point of failure. Thus, it would be highly beneficial to have a catch mechanism that engages the downhole motor drivetrain components sufficiently securely to retain the components in the event of a mechanical failure, but without the need for a threaded engagement with a drivetrain component.

BRIEF DESCRIPTION OF THE DRAWINGS

FIGS. 5A-B are each side views, in vertical section, depicting the wedge lock catch mechanism of FIG. 4, in which FIG. 5B is a relatively enlarged view relative to FIG. 5A.

DETAILED DESCRIPTION

The present disclosure describes new methods and apparatus for retaining components in a downhole motor in the event of a mechanical separation or failure of one or more components therein; and does so without requiring a threaded connection to the mud motor drivetrain components. The embodiments described herein include a mud motor having a catch assembly that will engage a component of the motor drivetrain to secure the catch assembly in a desired position to an internal motor component, without requiring threads on the drivetrain component. In these described embodiments, the catch assembly is sized and configured to have its downward longitudinal movement limited by a structural element of the mud motor assembly, so as to retain the catch assembly, and the components to which it is attached, within the mud motor assembly.

The following detailed description describes example embodiments of the new mud motor configuration including the new catch assembly with reference to the accompanying drawings, which depict various details of examples that show how the disclosure may be practiced. The discussion addresses various examples of novel methods, systems and apparatus in reference to these drawings, and describes the depicted embodiments in sufficient detail to enable those skilled in the art to practice the disclosed subject matter. Many embodiments other than the illustrative examples discussed herein may be used to practice these techniques. Structural and operational changes in addition to the alternatives specifically discussed herein may be made without departing from the scope of this disclosure.

In this description, references to "one embodiment" or "an embodiment," or to "one example" or "an example" in this description are not intended necessarily to refer to the same embodiment or example; however, neither are such embodiments mutually exclusive, unless so stated or as will be readily apparent to those of ordinary skill in the art having the benefit of this disclosure. Thus, a variety of combinations and/or integrations of the embodiments and examples described herein may be included, as well as further embodiments and examples as defined within the scope of all claims based on this disclosure, as well as all legal equivalents of such claims.

Figure 1:
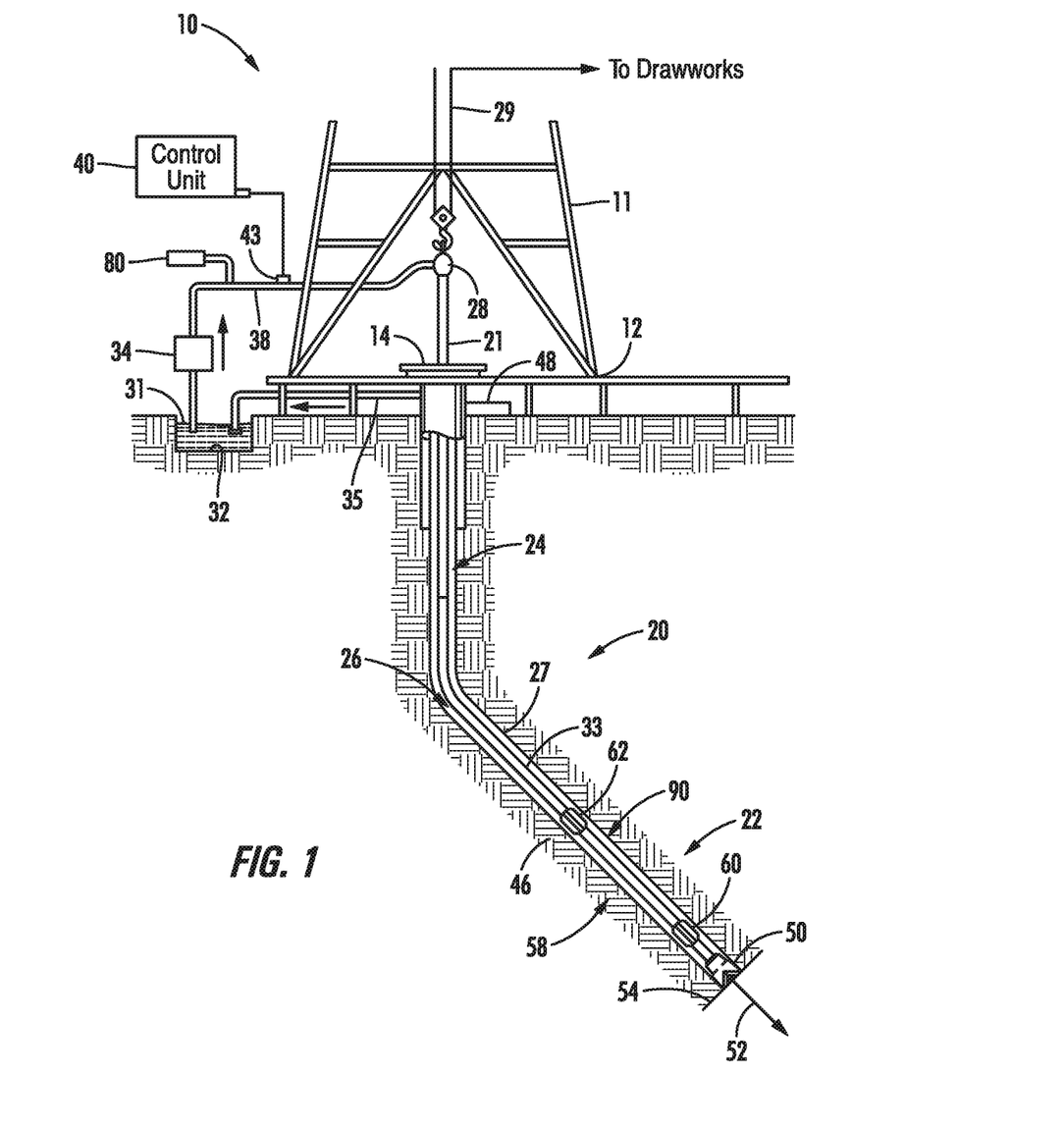
FIG. 1 is a schematic diagram of a drillstring including a downhole mud motor and associated drivetrain disposed in a well in one example operating environment.

Referring now FIG. 1, that figure schematically depicts an example directional drilling system, indicated generally at 10, which includes a positive displacement-type mud motor assembly 90 as may benefit from use of the structures and methods described herein. Many of the disclosed concepts are discussed with reference to drilling operations for the exploration and/or recovery of subsurface hydrocarbon deposits, such as petroleum and natural gas. However, the disclosed concepts are not so limited, and can be applied to other drilling operations. To that end, the aspects of the present disclosure are not necessarily limited to the arrangement and components presented in FIG. 1. For example, many of the features and aspects presented herein can be applied in horizontal drilling applications and vertical drilling applications without departing from the intended scope of the present disclosure. In addition, it should be understood that the drawings are not necessarily to scale and are provided purely for descriptive purposes; thus, the individual and relative dimensions and orientations presented in the drawings are not to be considered limiting.

Directional drilling system 10 includes a derrick 11, supporting a derrick floor 12. Derrick floor 12 supports a rotary table 14 that is driven at a desired rotational speed, for example, via a chain drive system through operation of a prime mover (not depicted). Rotary table 14, in turn, provides the necessary rotational force to a drill string 20. Drill string 20, includes a drill pipe section 24, which extends downwardly from the rotary table 14 into a directional borehole 26. As illustrated in the Figures, borehole 26 may travel along a multi-dimensional path or "trajectory." The three-dimensional direction of the bottom 54 of the borehole 26 of FIG. 1 is represented by a pointing vector 52.

A drill bit 50 is attached to the distal, downhole end of the drill string 20. When rotated, e.g., via the rotary table 14, the drill bit 50 operates to break up penetrate the geological formation 46. Drill string 20 is coupled through a kelly joint 21, swivel 28, and line 29 to a drawworks (not depicted). The drawworks may include various components, including a drum, one or more motors, a reduction gear, a main brake, and an auxiliary brake; and during a drilling operation can be operated to control the weight on bit 50 and the rate of penetration of drill string 20 into borehole 26. The structure and operation of such drawworks are generally known and are thus not described in detail herein.

During drilling operations, a suitable drilling fluid (commonly referred to in the art as drilling "mud") 31 can be circulated, under pressure, out of a mud pit 32 and into the borehole 26 through the drill string 20 by a hydraulic "mud pump" 34. The drilling fluid 31 may comprise, for example, water-based muds (WBM), which typically comprise one or more of a water-and-clay based composition; an oil-based mud (OBM), where the base fluid is a petroleum product, such as diesel fuel; or a synthetic-based mud (SBM), where the base fluid is a synthetic oil. Drilling fluid 31 passes from the mud pump 34 into drill string 20 via a fluid conduit (commonly referred to as a "mud line") 38 and the kelly joint 21. Drilling fluid 31 is discharged at the borehole bottom 54 through an opening or nozzle in the drill bit 50, and circulates in an "uphole" direction towards the surface through annulus 27, between the drill string 20 and the side of the borehole 26. As the drilling fluid 31 approaches the rotary table 14, it is discharged via a return line 35 into a mud pit 32. A variety of surface sensors 48, which are appropriately deployed on the surface of the borehole 26, operate alone or in conjunction with downhole sensors deployed within the borehole 26, to provide information about various drilling-related parameters, such as fluid flow rate, weight on bit, hook load, etc.

A surface control unit 40 may receive signals from surface and downhole sensors and devices via a sensor or transducer 43, which can be placed on the fluid line 38 to detect the mud pulses responsive to the data transmitted by the downhole transmitter 33. The transducer 43 in turn generates electrical signals, for example, in response to the mud pressure variations and transmits such signals to the surface control unit 40. Alternatively, other telemetry techniques such as electromagnetic and/or acoustic techniques or any other suitable techniques may be utilized. By way of example, wired drill pipe may be used to communicate between the surface and downhole devices. The surface control unit 40 can be operable to process such signals according to programmed instructions provided to surface control unit 40. Surface control unit 40 may present to an operator desired drilling parameters and other information via one or more output devices, such as a display, a computer monitor, speakers, lights, etc., which may be used by the operator to control the drilling operations. Surface control unit 40 may also contain a computer, memory for storing data, a data recorder, and other known and hereinafter developed peripherals. Surface control unit 40 may also include models and may process data according to programmed instructions, and respond to user commands entered through a suitable input device, which may be in the nature of a keyboard, touchscreen, microphone, mouse, joystick, etc.

In some embodiments of the present disclosure, the rotatable drill bit 50 is attached at a distal end of a steerable drilling bottom hole assembly (BHA) 22. In the illustrated embodiment, the BHA 22 is coupled between the drill bit 50 and the drill pipe section 24 of the drill string 20. The BHA 22 may comprise a Measurement While Drilling (MWD) System, designated generally at 58, with various sensors to provide information about the formation 46 and downhole drilling parameters. The MWD sensors in the BHA 22 may include, but are not limited to, a device for measuring the formation resistivity near the drill bit, a gamma ray device for measuring the formation gamma ray intensity, devices for determining the inclination and azimuth of the drill string, and pressure sensors for measuring drilling fluid pressure downhole. The MWD may also include additional/alternative sensing devices for measuring shock, vibration, torque, telemetry, etc. The above-noted devices may transmit data to a downhole transmitter 33, which in turn transmits the data uphole to the surface control unit 40. In some embodiments, the BHA 22 may also include a Logging While Drilling (LWD) System. As illustrated in FIG. 1, a surface transmitter/receiver 80 communicates with downhole tools using, for example, any of the transmission techniques described, such as a mud pulse telemetry technique. This can enable two-way communication between the surface control unit 40 and the downhole tools described below.

The BHA 22 can provide some or all of the requisite force for drill bit 50 to break through the formation 46 (known as "weight on bit"), and provide the necessary directional control for drilling the borehole 26. In the embodiments illustrated in FIGS. 1 and 2, the BHA 22 includes a drilling motor 90 and first and second longitudinally spaced stabilizers 60 and 62. At least one of the stabilizers 60, 62 may be an adjustable stabilizer that is operable to assist in controlling the direction of the borehole 26. The drilling motor 90 will typically be in the form of a positive displacement-type mud motor driven by circulation of the drilling mud (and will subsequently be referred to here as a "mud motor").

Circulation of the drilling mud causes rotation of a rotor within the power section of the mud motor 90 relative to a stator of the motor. The operation of such a mud motor is well known to persons skilled in the art, and will not be further addressed here. In conventional such positive displacement-type mud motors, the rotor follows an orbital, or eccentric, rotational path relative to the stator, which is typically generally aligned with the axis of the drill string in the region proximate the mud motor power section. The mud motor power section is coupled to a motor transmission which provides the transition to other complements within the drill string. The motor transmission assembly includes a drivetrain which couples the eccentrically rotating rotor to a drive member rotating relative to a single axis, to facilitate rotation of a drill bit.

Figure 2:
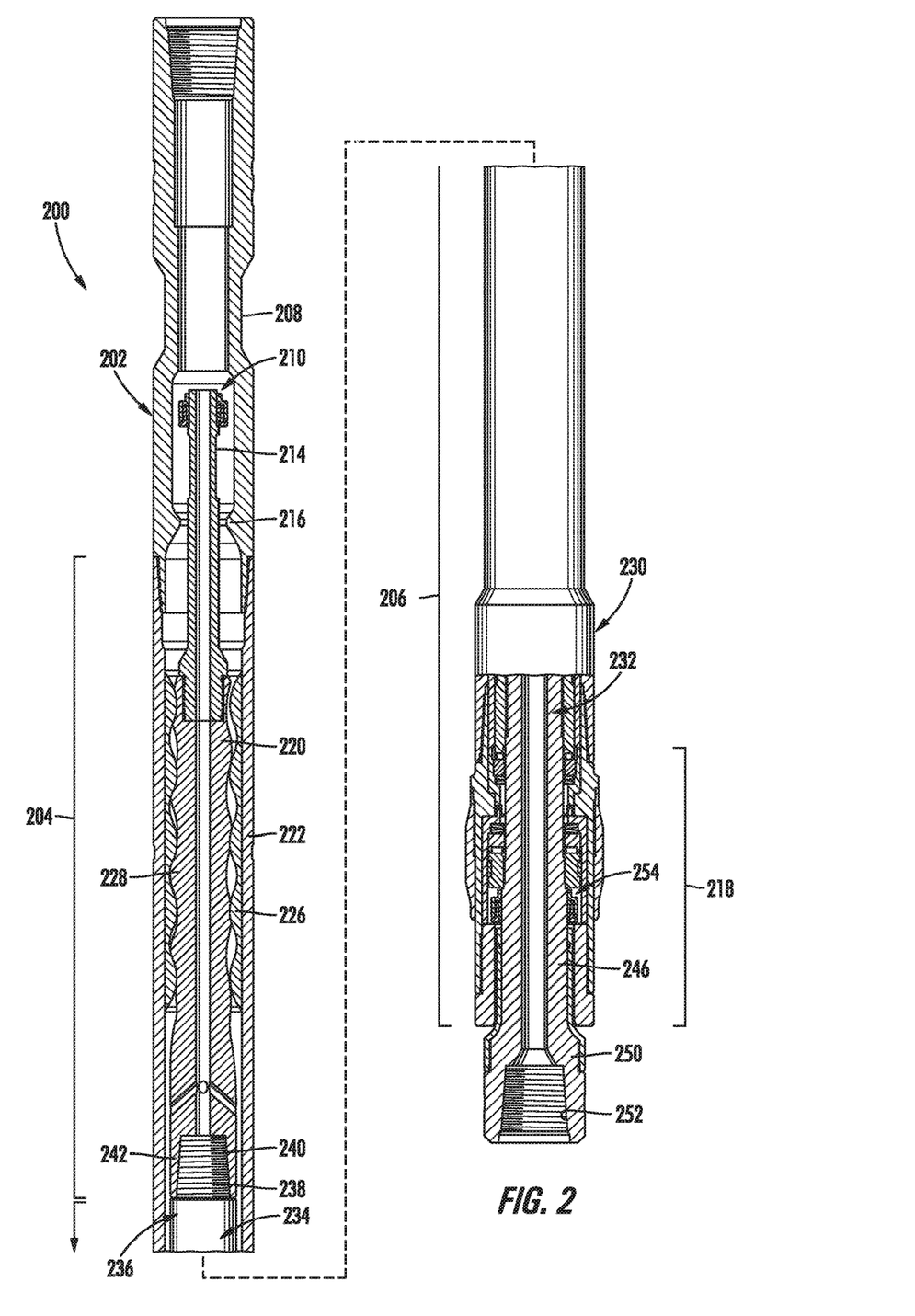
FIG. 2 is a depiction, partially in vertical section, of an example mud motor including an associated transmission assembly demonstrating an example wedge lock catch mechanism in two alternative placements.
Figure 3:
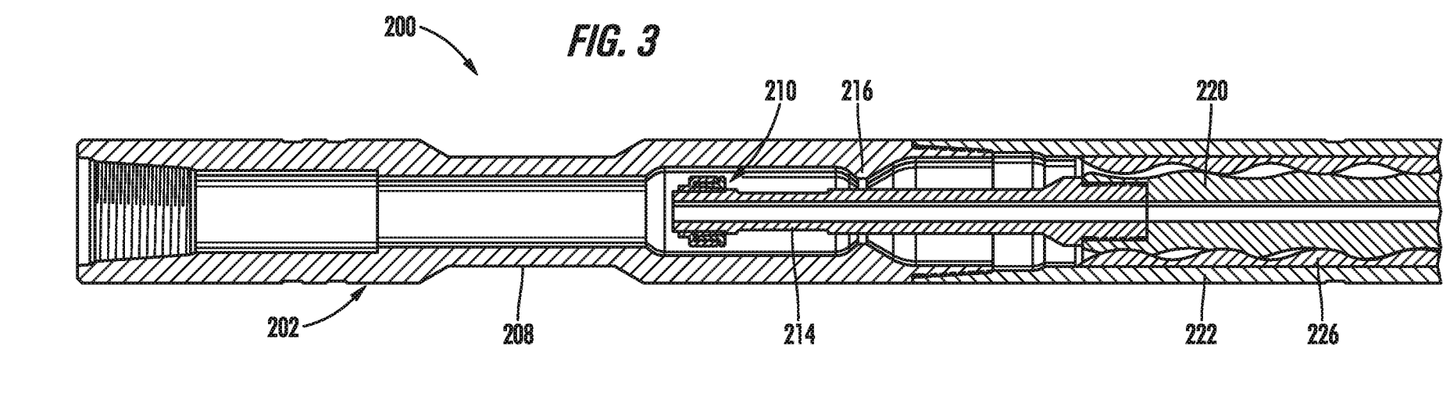
FIG. 3 is a vertical section depiction of the upper portion of the mud motor of FIG. 2, showing the example wedge lock catch mechanism in greater detail, and in a first example placement.

Referring now to FIG. 2, is a partial vertical section view of an example mud motor assembly 200. Mud motor assembly 200 includes an upper connection section, indicated generally at 202; which is coupled to a mud motor power section, indicated generally at 204; which is then coupled to a transmission and bearing assembly, indicated generally at 206. Upper connection section 202 includes a housing 208 which facilitates coupling of mud motor assembly 200 into the drill string (indicated at 20 in FIG. 1). Referring also to FIG. 3, that figure is an enlarged view of the portion of upper connection section 202 which houses a first catch assembly, indicated generally at 210. First catch assembly 210 engages an upper extension 214 which is coupled to rotor 220 of power section 204, and extends above rotor 220. Upper connection section 202 further defines an inwardly projecting shoulder 216 having an inner dimension configured to preclude passage of catch assembly 210, to thereby provide a "catch" function to retain components coupled to upper extension 214 in the event of a failure of one or more components that retain one or more components of the drivetrain within the remainder mud motor assembly 200.

Mud motor power section 204 includes a housing assembly 222 which forms a portion of the stator 224 of power section 204. In this example, mud motor power section 204 is a positive displacement-type motor, as discussed earlier herein, having a stator 224 that includes a plurality of inwardly projecting lobes (indicated generally at 226), while rotor 220 extends within stator 224 and has a differing set of external lobes (indicated generally at 228). In such positive displacement-type motors, mud traversing the irregularly-shaped annulus between rotor 220 and stator 224 will cause rotation of rotor 220. While a positive displacement-type mud motor is believed to be one configuration which will benefit from use of the present invention, other motors and/or other types of motors or other drive mechanisms may also benefit from incorporation of the methods and devices described herein.

Transmission and bearing assembly 206 includes an outer housing assembly 230, which couples to housing assembly 222 of power section 204, and includes at its lowermost extent, bearing assembly 218. The coupling between outer housing assembly 230 and housing assembly 222 may be either direct, or through one or more intermediate components. Transmission and bearing assembly 206 also includes a rotating drivetrain indicated generally at 232, which extends within housing assembly 222. Rotating drivetrain 232 will, in many embodiments, include a driveshaft assembly 234, which connects to rotor 220, and an output shaft 246 portion which extends from the lower extent of driveshaft assembly 234. For purposes of the present description, the term "output shaft 246" will be used to refer to the portion of the drivetrain which extends through bearing assembly 218. Thus, the term is used only to refer to the relatively lower portion of the motor drivetrain, and does not suggest any structural distinction from any other portion of the drivetrain, beyond a locational portion of the drivetrain—that portion extending within the bearing assembly 218.

Driveshaft assembly 234 includes a first end portion, indicated generally at 236, which forms one portion of a threaded coupling 238 which couples driveshaft assembly 234 to the rotor 220 of mud motor power section 204. In the depicted example, first end portion 236 includes a pin connection 240 configured to threadably couple to a box connection 242 of mud motor rotor 220. In some example constructions, box connection 242 will be a separate coupling fitting secured either directly to rotor 220 or to one or more intervening component(s) which in turn engage rotor 220. In some examples, the placement of the pin connection 240 and box connection 242 in threaded coupling 238 may be reversed, such that the rotor (or rotor assembly) 220 terminates with the pin connection, and first end portion 236 terminates with the box connection of the threaded coupling.

In some embodiments, it may be possible for the entire drivetrain (including driveshaft assembly 234 and output shaft 246) to be formed as a single structure. However, for many applications, it will be preferable for the portion termed herein the "output shaft 246" to be a separate component which couples to a lower portion of driveshaft assembly 234. Additionally, in many embodiments, driveshaft assembly 234 may itself include multiple components. For example, driveshaft assembly 234 serves to translate eccentric motion of the rotor 222 to single axis rotation proximate the bearing assembly 244 (and particularly the radial bearing assembly as indicated at 506 in FIGS. 5A-B). Thus, in some embodiments, driveshaft assembly 234 may have a central portion configured for relative flexibility, in order to facilitate such function, but may have other sections configured to couple to other components of the drivetrain, for example, such as a separate output shaft 246 portion extending through bearing assembly 218. The forming of driveshaft assembly through multiple components may ease manufacturing and transportation of the driveshaft assembly components. At the lower end of the drivetrain is a second end portion 250 which forms a portion of a second threaded coupling 252. Threaded coupling 252 facilitates coupling directly or indirectly to a drill bit or other rotating components (not depicted).

Figure 5A:
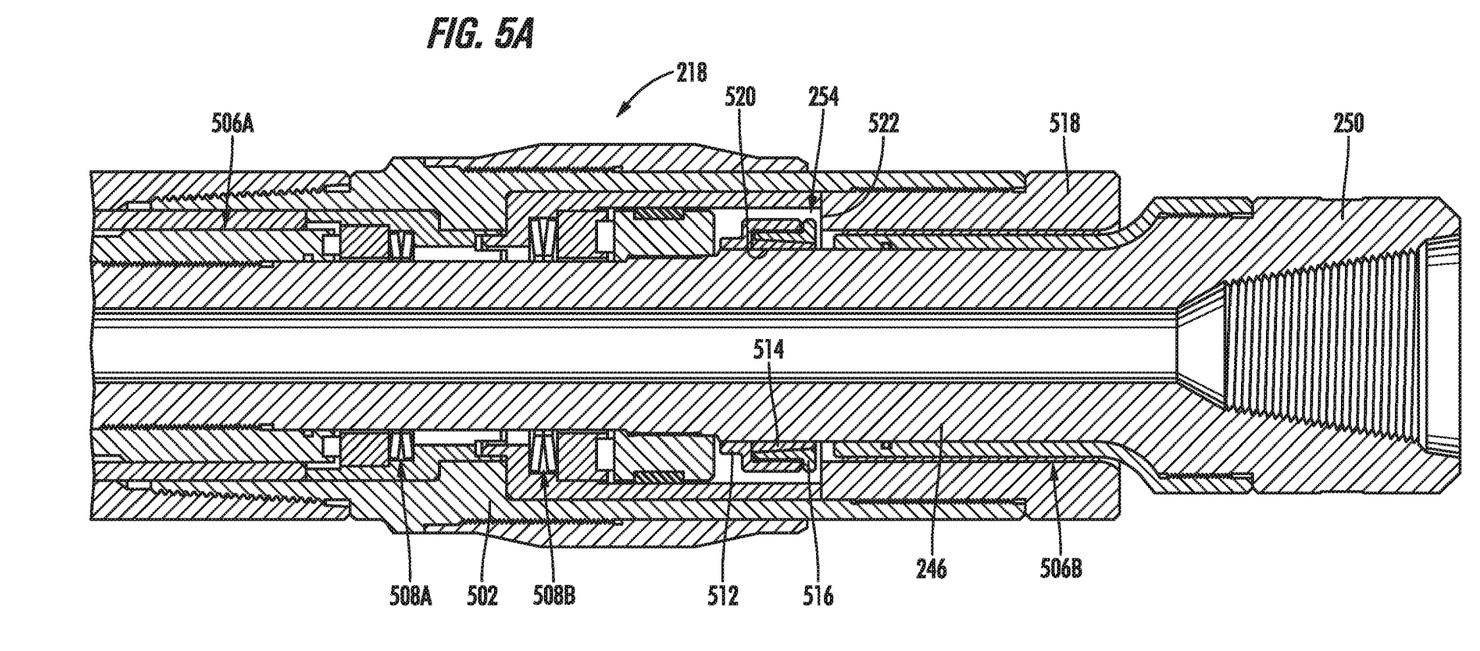
Figure 5B:
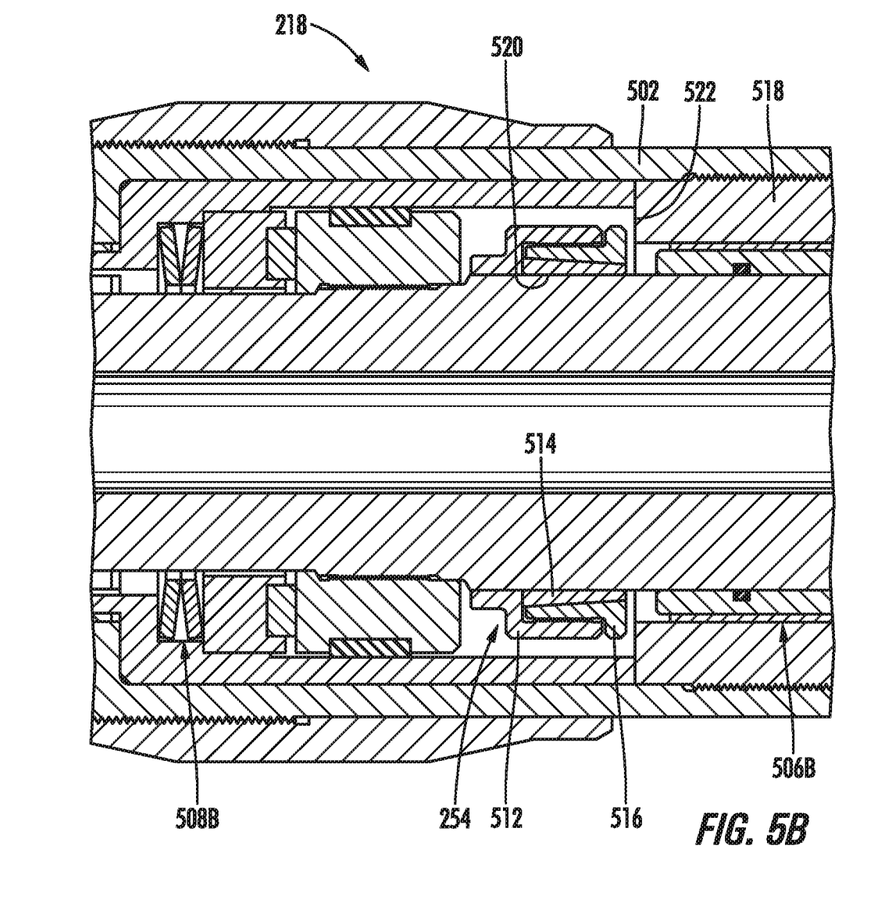

Bearing assembly 218 houses a second catch assembly, indicated generally at 254 (and depicted in more detail in FIGS. 5A-B). In the depicted example, second catch assembly 254 engages an exterior surface of output shaft 246 as it extends through bearing assembly 218. In this example, the construction of second catch assembly 254 will be structurally analogous to that as will be described for first catch assembly 210. It should be understood that the reference to "first catch assembly" and "second catch assembly" is for clarity of reference in identifying two alternative placements for a catch assembly in FIG. 2, and does not suggest that all (or any) embodiments will necessarily include two catch assemblies. Many contemplated embodiments of mud motor assemblies will include only a single catch assembly located in a desired position; but other embodiments in accordance with the present disclosure may include two, or even more, catch assemblies.

Figure 4A:
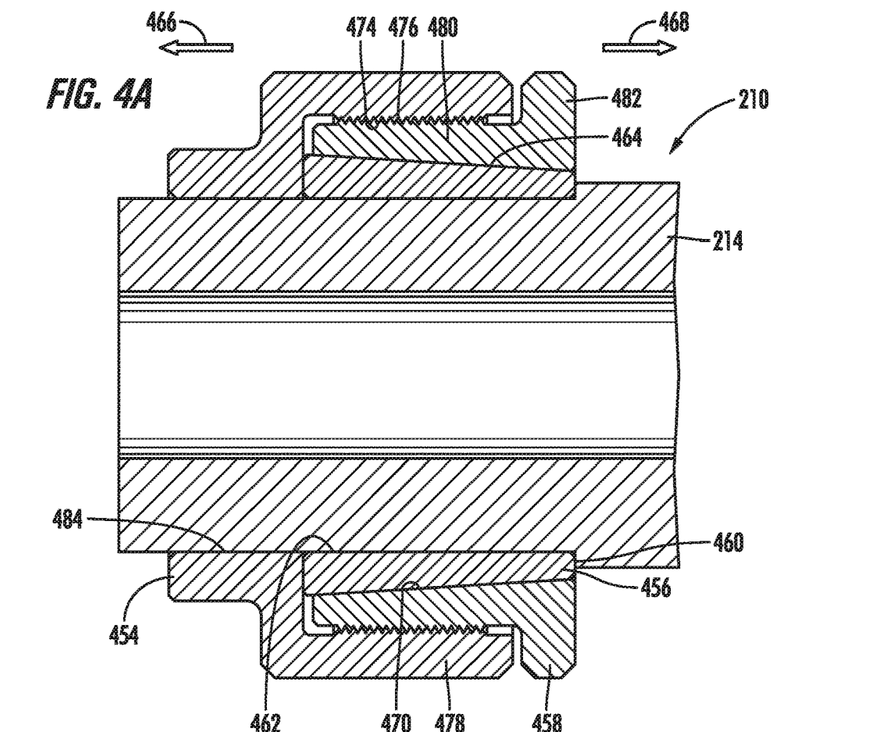
FIG. 4A-B are each vertical section depictions of the wedge lock catch mechanism of FIGS. 2 and 3; shown in vertical section in FIG. 4A; and in an oblique vertical section in FIG. 4B.
Figure 4B:
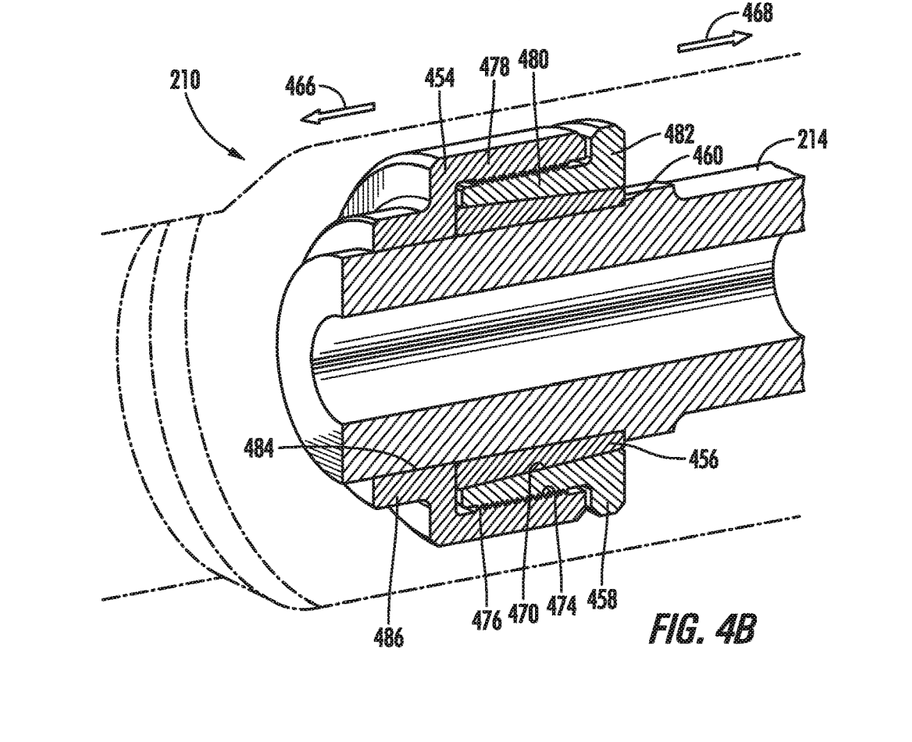

Referring now to FIGS. 4A-B, these figures depict first catch assembly 210 of FIGS. 2 and 3, depicted in FIG. 4A in vertical section and in FIG. 4B in an oblique view and vertical section; in each case depicted in an operating configuration installed on a central supporting component. In the depicted example, catch assembly 210 is in position on upper extension 214, as depicted in FIGS. 2 and 3.

Catch assembly 210 includes three generally annular components arranged in concentric relation to upper extension 214: catch retainer 454, wedge ring 456, and drive ring 458. Catch assembly 210 will, in most embodiments, be configured to engage a smooth cylindrical surface 484 of a component in the downhole motor, and most commonly a component in the downhole motor drivetrain. In the depicted example, wedge ring 456 sits against a shoulder 460 formed on upper extension 214. While such shoulder is useful in some embodiments to ease assembly of catch assembly 210 in position on upper section 214, other embodiments may not include such a shoulder. Wedge ring 456, in this example, is a solid annular component having a generally cylindrical inner surface 462 sized to engage the cylindrical surface 484 of upper section 214, and a radially tapering outer surface 464. Wedge ring 456 tapers in thickness to be wider toward the relatively uphole portion of catch assembly 210, as indicated by arrow 466, relative to its width toward a relatively downhole portion of catch assembly 210, as indicated by arrow 468. Thus in the depicted example, wedge ring 456 may be seen as having a generally frusto-conical external form defined by an inclined outer surface 464, which expands radially as it extends in the uphole direction 466. In other embodiments, wedge ring 456 may not be a continuous annular component but instead may have a small separation therein to assist radial compression to engage the cylindrical surface of upper section 214.

Drive ring 458 includes an engagement portion, indicated generally at 480, and a lower portion, in this embodiment, in the form of a lower flange 482. Engagement portion 480 includes a radially tapering internal surface 470 defining an internal diameter that decreases in the downhole direction 468. Preferably, the taper of internal surface 470 will be a complement to the taper on the outer surface 464 of wedge ring 456. As a result, when drive ring 458 is placed in concentric relation to wedge ring 456, outer surface 464 of wedge ring 456 and inner surface 470 of drive ring 458 together form a ramp, whereby movement of drive ring 458 in an uphole direction 466 relative to wedge ring 456 will exert a compressive force on wedge ring 456 biasing wedge ring 456 into compressive engagement with upper extension 214. Accordingly, drive ring 458 engagement portion 480 includes an externally threaded region 474 containing threads configured to engage a complementary threaded region 476 on catch retainer 454.

In this example embodiment, catch retainer 454 includes a body portion 486, having an internal diameter sized to relatively closely engage the exterior cylindrical surface 484 of upper section 214, and a flange portion 478 which extends in radially-spaced relation to upper section 214 and provides a receiving area to receive wedge ring 456 and drive ring 458. Flange portion 478 also includes previously-identified threaded region 476 configured to engage threaded region 474 on drive ring 458.

In assembling of catch assembly 210, drive ring 458 will be placed around upper section 214, and then wedge ring 456 will be placed around upper section 214. In an embodiment such as that depicted, with a shoulder 460 formed an upper section 214, wedge ring 456 will preferably be seated against shoulder 460. Drive ring 458 may then be slid along the ramp formed by outer surface 464 of wedge ring 456 and then threaded to flanged portion 478 of catch retainer 454. The threaded connection between drive ring 458 and catch retainer 454 may then be further tightened, and torqued to a selected degree, such as one previously determined as sufficient to compress wedge ring 456 into a friction fit with upper section 214 sufficient to avoid catch assembly 210 moving from essentially fixed engagement in position on upper section 214 under loading resulting from failure of one or more components within the mud motor assembly (200 in FIG. 2).

In the event of a failure in mud motor assembly 220 sufficient to allow downward movement of rotor 220, and upper section 214 coupled thereto, first catch assembly 210 will engage the inwardly projecting shoulder (216 in FIG. 2). As can be appreciated from the view of FIG. 3, any engagement between the lowermost portion of first catch assembly 210, will be between bottom shoulder 482 of drive ring 458 and shoulder 216, and thus will only tend to bias drive ring 458 in a direction to increase compression on wedge ring 456.

In order to facilitate the described torqueing of the threaded assembly, in some embodiments, a suitable engagement mechanism may be formed on the bottom shoulder 480 of drive ring 458 and/or on an exterior surface of catch retainer 454. Such an engagement mechanism may be, for example, flat surfaces ("flats") configured to facilitate engagement by a wrench. In other embodiments, drive holes may be provided which are engageable by a pin wrench in order to rotate drive ring 458 or catch retainer 454 relative to the other to a desired torque level.

Referring now to FIGS. 5A-B, FIG. 5A depicts a vertical section of a portion of mud motor bearing assembly 218 incorporating a second catch assembly; FIG. 5B depicts a vertical section of the portion of the bearing assembly including the second catch assembly in greater detail. Bearing assembly 218 includes a housing assembly, indicated generally at 502, terminating in a bearing cap 518. An output shaft of the drivetrain (246 in FIG. 2) extends through bearing assembly 218, and includes a box coupling 250 to facilitate attachment to a drill bit or other rotating component to be coupled thereto (not depicted). Bearing assembly 218 includes a pair of spaced radial bearing assemblies, indicated generally at 506A and 506B, configured to restrain rotation of output shaft 246 to rotation about a single axis. In the depicted example, a lower bearing cap 518 engages the remainder of housing assembly 502, and forms a portion of the lower radial bearing assembly 506B. In this configuration, lower radial bearing 506B is used to support loading from the bit, while the upper radial bearing 506A bears the internal loading of the drivetrain as the orbital rotation of the rotor is transferred to single axis rotation at the upper radial bearing 506A.

Bearing assembly 218 also includes one or more longitudinal bearing mechanisms (or "thrust bearings"), as indicated generally at 508A, 508B, configured to address compressional loads through the drivetrain, as may be encountered, for example, by the rotation and impacts of an attached drill bit while drilling. The specific configuration of individual bearing mechanisms, both radial and longitudinal, may be of any suitable configuration as known to persons skilled in the art.

In the depicted example, as noted previously herein, catch assembly 254 has an analogous structure to that described relative to catch assembly 210 (of FIGS. 2-4), including a catch retainer 512, a wedge ring 514, and a drive ring 516. Each of these three components is of the basic structure as described previously herein relative to catch assembly 210, and thus that description will not be repeated here. It should be noted, however, that the relative sizes of each of these three components will, in most embodiments, likely be different from the dimensions of the components of alternative first catch assembly 210 (and will typically be larger than those of catch assembly 210) in accordance with their placement on output shaft 246.

One additional difference of catch assembly 254 relative to catch assembly 210 is that wedge ring 514 is not seated against a shoulder, but engages a continuous cylindrical surface portion 520 of output shaft 246. Additionally, in the depicted example, in inwardly extending upper shoulder 522 of lower bearing cap 518 provides a catch surface to restrict downward movement of catch assembly 254 and any components coupled thereto.

As identified previously herein, the drivetrain assembly must make a transition from orbital rotation at the rotor of the mud motor power section (204 in FIG. 2) to essentially single axis rotation through the radial bearings (506A, 506B in FIGS. 5A-B). Because of the stresses imposed by this transition and those imposed by thrust loading on the drivetrain, one potential location of failure within a rotating drivetrain is closely adjacent the lowermost longitudinal (thrust) bearing assembly proximate the output shaft portion of the drivetrain. As a result, it is beneficial to place a catch element adjacent a relatively lower portion of the rotating drivetrain, and ideally below the lower thrust bearing assembly (508B), to enable retention of the lowermost portion of the drivetrain in the event of failure proximate the lower longitudinal bearing. The compact size of the described catch assembly, and the ability of the assembly to engage a smooth cylindrical surface, facilitates placement of the catch assembly in the position depicted in FIGS. 5A-B, above and generally adjacent the lower radial bearing 506B, but below the longitudinal bearings as indicated at 508A, 508B. Thus, the described catch assembly facilitates providing a catch assembly at a desirable location on the drivetrain assembly.

According to aspects of the present disclosure, a catch mechanism for a downhole motor may include a wedge member having a curvilinear inner surface sized to engage a smooth cylindrical surface of a component in the downhole motor and/or a drive member that extends at least partially around the wedge element. In some embodiments of the catch mechanism, at least one of the wedge member and the drive member may include a tapered surface in contact with the other member, with the tapered surface arranged such that longitudinal movement between the drive member and the wedge member compresses the wedge member into fixed engagement with the surface of the downhole motor component.

According to aspects of the present disclosure, the catch mechanism will further include a retainer member; and the drive member may be configured to engage the retainer member so as to cause longitudinal movement between the drive member and the wedge member to compress the wedge member into the fixed engagement with the downhole motor component. In some such embodiments, as described herein, the drive member threadably engages the retainer member; and may extend generally concentrically around at least a portion of the wedge member. In some systems, the retainer member will be located relatively uphole of the wedge member. In any of the described catch mechanisms, the wedge member can be of any of many configurations, including, being a solid annular member, a split annular member; and as noted above may have a tapered surface, or not.

In some embodiments as described herein, the retainer member may include a flange portion that extends in concentric relation around at least a portion of the drive member. In many systems, increasing threaded engagement of the drive member with the retainer member results in relative movement between the first and second tapered surfaces to compress the wedge member against the motor component. In some aspects of the described mechanisms the wedge member includes a first tapered surface; and is some assemblies, the drive member will include a second tapered surface arranged to engage the first tapered surface.

According to additional aspects of the present disclosure, a method of assembling a downhole motor may include placing a rotating component of the motor within a housing assembly, placing a catch mechanism in adjacent the generally cylindrical engagement surface, a drive member that extends at least partially around the wedge element, a retainer member engageable with the drive member and securing the catch mechanism to the generally cylindrical surface by moving one of the drive member and the retainer member relative to the other member. In some embodiments, the housing assembly supports a generally inwardly extending shoulder, or may be in a sub or other structure coupled within the housing assembly.

In some aspects, the rotating component may include a generally cylindrical engagement surface located to the uphole side of the radially extending shoulder; and the catch mechanism may include a wedge member having a curvilinear inner surface sized to engage a smooth cylindrical surface of a component in the downhole motor. In some embodiments, at least one of the wedge member and the drive member may include a tapered surface in contact with the other member, the tapered surface arranged such that longitudinal movement between the drive member and the wedge member compresses the wedge member into fixed engagement with the surface of the downhole motor component. In some embodiments, this longitudinal movement between the drive member and the wedge member may be achieved by an engagement, threaded or otherwise, between the drive member and a retainer member.

Many variations may be made in the structures and techniques described and illustrated herein without departing from the scope of the inventive subject matter. Accordingly, the scope of the inventive subject matter is to be determined by the scope of the following claims and all additional claims supported by the present disclosure, and all equivalents of such claims.

We claim:

1. A catch mechanism for a downhole motor, consisting of:
   a continuous annular wedge member having a tapered outer surface and a curvilinear inner surface sized to engage a smooth cylindrical surface of a component in the downhole motor;
   a continuous annular drive ring having a threaded outer surface and sized to extend concentrically around the wedge member such that at least a portion of a tapered inner surface of the drive ring contacts with at least a portion of the tapered outer surface of the wedge member;
   a continuous annular retainer member having a threaded inner surface shaped to threadably engage with the threaded outer surface of the drive ring; and
   wherein increasing threaded engagement of the drive ring with the retainer member results in relative movement between the outer tapered surface of the wedge member and the inner tapered surface of the drive ring to compress the wedge member against the component in the downhole motor.

2. The catch mechanism of claim 1, wherein the retainer member includes a flange portion that extends in concentric relation around the drive ring, the flange portion having the threaded inner surface.

3. A downhole motor, comprising:
a housing assembly;
a rotating component supported within the housing assembly;
the rotating component having an engagement surface; and
a catch mechanism, consisting of:
a continuous annular wedge member having a tapered outer surface and a curvilinear inner surface sized to engage the engagement surface of the rotating component;
a continuous annular drive ring having a threaded outer surface and sized to extend concentrically around the wedge member such that at least a portion of a tapered inner surface of the drive ring contacts with at least a portion of the tapered outer surface of the wedge member;
a continuous annular retainer member having a threaded inner surface shaped to threadably engage with the threaded outer surface of the drive ring; and
wherein increasing threaded engagement of the drive ring with the retainer member results in relative movement between the outer tapered surface of the wedge member and the inner tapered surface of the drive ring to compress the wedge member into fixed engagement with the engagement surface of the rotating component.

4. The downhole motor of claim 3, wherein the downhole motor includes a rotor arranged for rotation within a stator, and wherein the rotating component is coupled to the rotor and is above the rotor.

5. The downhole motor of claim 3, wherein the engagement surface of the rotating component is a smooth cylindrical surface.

6. The downhole motor of claim 3, wherein the downhole motor includes a rotor arranged for rotation within a stator, and wherein the rotating component is coupled to the rotor and is situated below the rotor.

7. The downhole motor of claim 6, wherein the engagement surface of the rotating component is located on an output shaft of the downhole motor.

8. The downhole motor of claim 6, wherein the housing assembly comprises one or more radially inwardly extending surfaces defining a central opening sized to prevent passage of the catch mechanism therethrough.

9. The catch mechanism of claim 3, wherein the retainer member includes a flange portion that extends in concentric relation around the drive ring, the flange portion having the threaded inner surface.

10. A downhole motor assembly having a catch mechanism, comprising:
a housing assembly;
a bearing assembly supported within the housing assembly;
a motor driveshaft assembly extending with in the housing assembly and through the bearing assembly, the motor driveshaft assembly having a first end with a coupling configured to couple to a rotor of the downhole motor assembly; and
a catch assembly engaging the motor driveshaft assembly at a first location thereof, the first location having a cylindrical surface, the catch assembly comprising;
a continuous annular wedge member having a tapered outer surface and extending coaxially around at least a portion of the circumference of the motor driveshaft assembly,
a continuous annular drive ring having a threaded outer surface and sized to extend concentrically around the wedge member such that at least a portion of a tapered inner surface of the drive ring contacts with at least a portion of the tapered outer surface of the wedge member;
a continuous annular retainer member having a threaded inner surface that is threadably engaged with the threaded outer surface of the drive ring; and
wherein increasing threaded engagement of the drive ring with the retainer member results in relative movement between the outer tapered surface of the wedge member and the inner tapered surface of the drive ring to compress the wedge member to secure the wedge member in fixed longitudinal position relative the motor drive shaft assembly.

11. The downhole motor assembly of claim 10, wherein the housing assembly defines a radially inwardly extending surface defining an opening of a dimension that will prevent longitudinally downward movement of the catch assembly in the event of a separation of components coupled to the rotor of the downhole motor assembly.

12. A method of assembling a downhole motor, comprising:
placing a rotating component of the downhole motor within a housing assembly, wherein the housing assembly supports a inwardly extending shoulder, and wherein the rotating component includes a cylindrical engagement surface located to the uphole side of the inwardly extending shoulder;
placing a catch mechanism adjacent the cylindrical engagement surface, the catch mechanism consisting of:
a continuous annular wedge member having a tapered outer surface and a curvilinear inner surface sized to engage a smooth cylindrical surface of the rotating component in the downhole motor;
a continuous annular drive ring having a threaded outer surface and sized to extend concentrically around the wedge member such that at least a portion of a tapered inner surface of the drive ring contacts with at least a portion of the tapered outer surface of the wedge member; and
a continuous annular retainer member having a threaded inner surface that is threadably engaged with the threaded outer surface of the drive ring; and
securing the catch mechanism to the smooth cylindrical surface of the rotating component by increasing threaded engagement between the drive ring and the retainer member, causing longitudinal movement between the drive ring and the wedge member to compress the wedge member into fixed engagement with the smooth cylindrical surface of the rotating component.

13. The method of claim 12, wherein the inwardly extending shoulder is formed as a portion of a sub within the housing assembly.

14. The method of claim 13, wherein the inwardly extending shoulder is formed as a portion of a bearing sub closing the lower end of the housing assembly.

* * * * *